United States Patent [19]

Morikawa et al.

[11] Patent Number: 5,150,455
[45] Date of Patent: Sep. 22, 1992

[54] IMAGE DATA PROCESSOR

[75] Inventors: Takashi Morikawa; Ikunori Yamaguchi, both of Osaka, Japan

[73] Assignee: Minolta Camera Kabushiki Kaisha, Osaka, Japan

[21] Appl. No.: 550,370

[22] Filed: Jul. 10, 1990

[30] Foreign Application Priority Data

Jul. 12, 1989 [JP] Japan .................................. 1-181241

[51] Int. Cl.⁵ .......................................... G06K 15/00
[52] U.S. Cl. ...................................... 395/114; 395/110
[58] Field of Search ............... 395/101, 110, 114, 115, 395/162, 163, 164, 166; 358/462, 467, 296; 400/61, 65; 382/56; 346/154

[56] References Cited

U.S. PATENT DOCUMENTS 4,553,172 11/1985 Yamada .......................... 358/296
4,682,190 7/1987 Ikeda ............................ 346/154

FOREIGN PATENT DOCUMENTS 61-290526 12/1986 Japan .

Primary Examiner—Arthur G. Evans
Attorney, Agent, or Firm—Burns, Doane, Swecker & Mathis

[57] ABSTRACT

An image data processor for use in an image forming apparatus in which image data of one page are received from outside and bit data based on the image data are supplied to a printing portion in a predetermined quantity each time such that a whole of an image of the one page is printed, the image data processor comprising: an analysis means for sequentially analyzing the image data received from the outside; a data formulating means for sequentially formulating the bit data in accordance with analytic results of the image data by the analysis means; first and second memories for storing the bit data formulated by the data formulating means; the first memory having a memory capacity enabling storage of the predetermined quantity of the bit data; an output means for outputting to the first memory, the bit data stored in the second memory; and a supply means for supplying to the printing portion, the predetermined quantity of the bit data stored in the first memory.

8 Claims, 7 Drawing Sheets

TCA ↓

| Cell No. NC | Address ADS |
|---|---|
| 0 | 0 |
| 1 | 3FFE0 |
| 2 | 3FA04 |
| 3 | 3F428 |
| ⋮ | ⋮ |

IMAGE DATA PROCESSOR

BACKGROUND OF THE INVENTION

The present invention relates to an image data processor which is employed for processing image data of one page in, for example, a page printer.

Generally, in a page printer, for example, a laser beam printer, it has been so arranged that print data of one page transmitted from a host computer or the like are expanded in a bit map type page memory and scanning by laser beams and an electrophotographic process are started in response to reading of the print data from the page memory such that the image of one page is printed at high speed.

However, since provision of the page memory for one page raises production cost of the memory element, so-called strip map type image processing is usually utilized. In strip map type image processing, an imaginary screen of one page is divided into several to ten plus several bands and two band buffers each corresponding, in capacity, to each of the bands are provided. At the time of printing, the image data are written in and read from the two band buffers alternately such that the image data of one page are outputted to a laser beam generator or the like.

In strip map type image processing referred to above, since the image data are written in and read from the band buffers alternately and continuously a the time of printing, writing of the image data in the band buffers is especially required to be performed at high speed. Therefore, in the known image data processing method, such a problem arises that it is difficult to handle graphic data.

Namely, in the case where data transmitted from a host computer are character data (character codes), it is possible to directly expand (transfer) the data to the band buffers at high speed on the basis of the character codes by referring to character font provided in the printer. Thus, the above described problem can be obviated sufficiently even in the known image data processing method.

However, in the case where data from the host computer are vector type graphic data, it is time-consuming to not only analyze the vector data but obtain dot data through arithmetic operation so as to expand the dot data. Thus, expansion (writing) in the band buffers is performed so belatedly as not to be completed before the next reading and therefore, does not keep up with speed of the electrophotographic process.

Meanwhile, in the case where data from the host computer are raster type graphic data, it becomes necessary to provide a memory area having a large capacity for temporarily storing the graphic data.

SUMMARY OF THE INVENTION

Accordingly, an essential object of the present invention is to provide, with a view to eliminating the above described inconveniences inherent in the prior art, an image data processor which does not require a large memory area and enables writing in band buffers at high speed and is capable of handling graphic data.

In order to accomplish this object of the present invention, an image data processor for use in an image forming apparatus in which image data of one page are received from outside and bit data based on the image data are supplied to a printing portion in a predetermined quantity each time such that a whole of an image of the one page is printed, according to the present invention comprises: an analysis means for sequentially analyzing the image data received from the outside; a data formulating means for sequentially formulating the bit data in accordance with analytic results of the image data by said analysis means; first and second memories for storing the bit data formulated by said data formulating means; said first memory having a memory capacity enabling storage of the predetermined quantity of the bit data; an output means for outputting to the first memory, the bit data stored in said second memory; and a supply means for supplying to said printing portion, the predetermined quantity of the bit data stored in said first memory.

In accordance with the present invention, the graphic data are expanded into the image data for each cell and are stored in a cell area of the cell in the band buffers. At this time, in the case where there is a possibility that rewriting takes place in the cell area, an address of the cell area in a video buffer is registered in a registration cell address table.

When data of the same cell as the already registered cell area are expanded rewriting is performed in the same cell area by referring to the registration cell address table. In the case where there is no possibility that rewriting takes place in the cell area, the address of the cell area is not stored.

BRIEF DESCRIPTION OF THE DRAWINGS

This object and features of the present invention will become apparent from the following description taken in conjunction with the preferred embodiment thereof with reference to the accompanying drawings, in which:

FIG. 8 is a view showing a cell map;

FIG. 9 is a view showing a registration cell address table; and

Before the description of the present invention proceeds, it is to be noted that like parts are designated by like reference numerals throughout several views of the accompanying drawings.

DETAILED DESCRIPTION OF THE INVENTION

Figure 1:
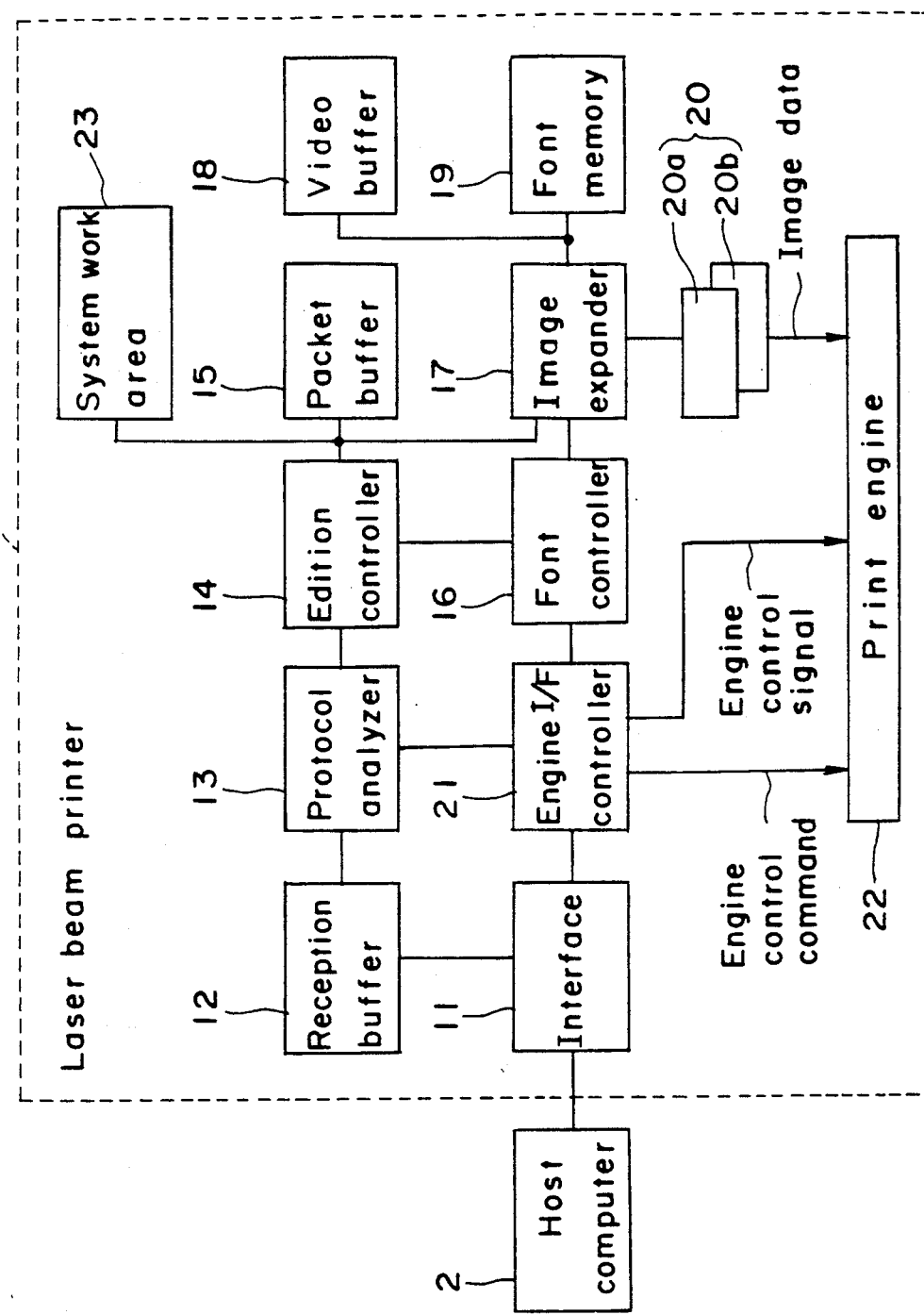
FIG. 1 is a block diagram showing one example of an arrangement of a laser beam printer employing an image data processor according to one embodiment of the present invention.

Referring now to the drawings, there is shown in FIG. 1, a laser beam printer 1 employing an image data processor according to one embodiment of the present invention. In FIG. 1, the laser beam printer 1 includes an interface 11 for receiving data transmitted from a host computer 2 and transferring the received data (reception data) to a reception buffer 12, a protocol analyzer 13 for analyzing the reception data so as to identify kinds of the reception data, an edition controller 14 for calculating, in the case where the reception data are print data, cursor positions (address positions) so as to produce packets PK to be described later, a packet buffer 15 for storing the produced packets PK and a font controller 16 for controlling font data stored in a font memory 19 and down-load font data DD stored in a video buffer 18 for storing the font data down-loaded from the host computer 2, i.e. the down-load font data DD and image data (cell data DC) expanded by an image expander 17.

The image expander 17 is provided for expanding graphic data DG in the video buffer 18 on the basis of the packets PK so as to transfer image data to a band buffer 20 at the time of printing. The band buffer 20 includes band buffers 20a and 20b in which reading and writing are performed alternately at the time of printing. The laser beam printer 1 further includes an engine interface controller 21 for controlling a print engine 22 and for performing display control. The print engine 22 is provided with a laser beam generator and an electrophotographic processor.

Each of the band buffers 20a and 20b is a bit map type memory. In each of the band buffers 20a and 20b, imaginary space of one page is divided into n bands (n natural number) by lines parallel to an abscissa such that each of the band buffers 20a and 20b has a capacity equivalent to that of each of the divided bands. In this embodiment, vertical size of the divided bands, i.e. in the auxiliary scanning direction is so set as to have 160 dots (picture elements). Hereinbelow, either one or both of the band buffers 20a and 20b are referred to as the band buffer 20.

Figure 7:
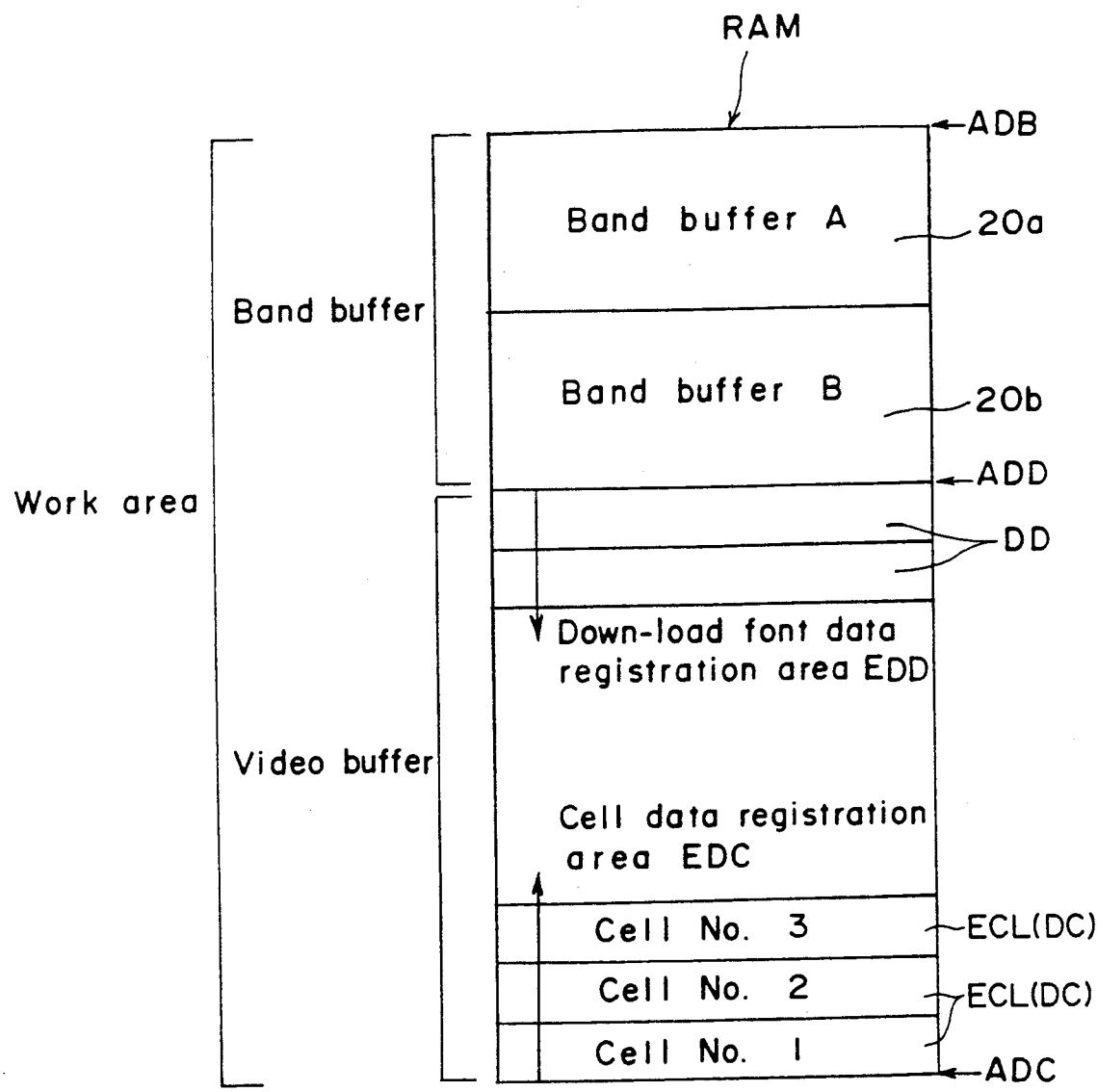
FIG. 7 is a view showing memory areas of a band buffer and a video buffer.

FIG. 7 shows memory areas of the band buffer 20 and the video butter 18. In FIG. 7, the band buffers 20a and 20b are sequentially allocated to an area usable as a work area of a random access memory (RAM) mounted in the laser beam printer 1 from an initial address ADB. The remaining area can be used as the video buffer 18. In the area of the video buffer 18, a down-load font data registration area EDD for storing the down-load font data DD is allocated to a portion from an initial address ADD and a cell data registration area EDC for expanding and storing the cell data DC to be described later is allocated to a portion from a final address ADC. In the area of the video buffer 18, a pointer for indicating a position for writing the next data is provided for each of the down-load font data DD and the cell data DC. Namely, each time the download font data DD or the cell data DC are written, respective positions of the pointers are updated.

Figure 10:
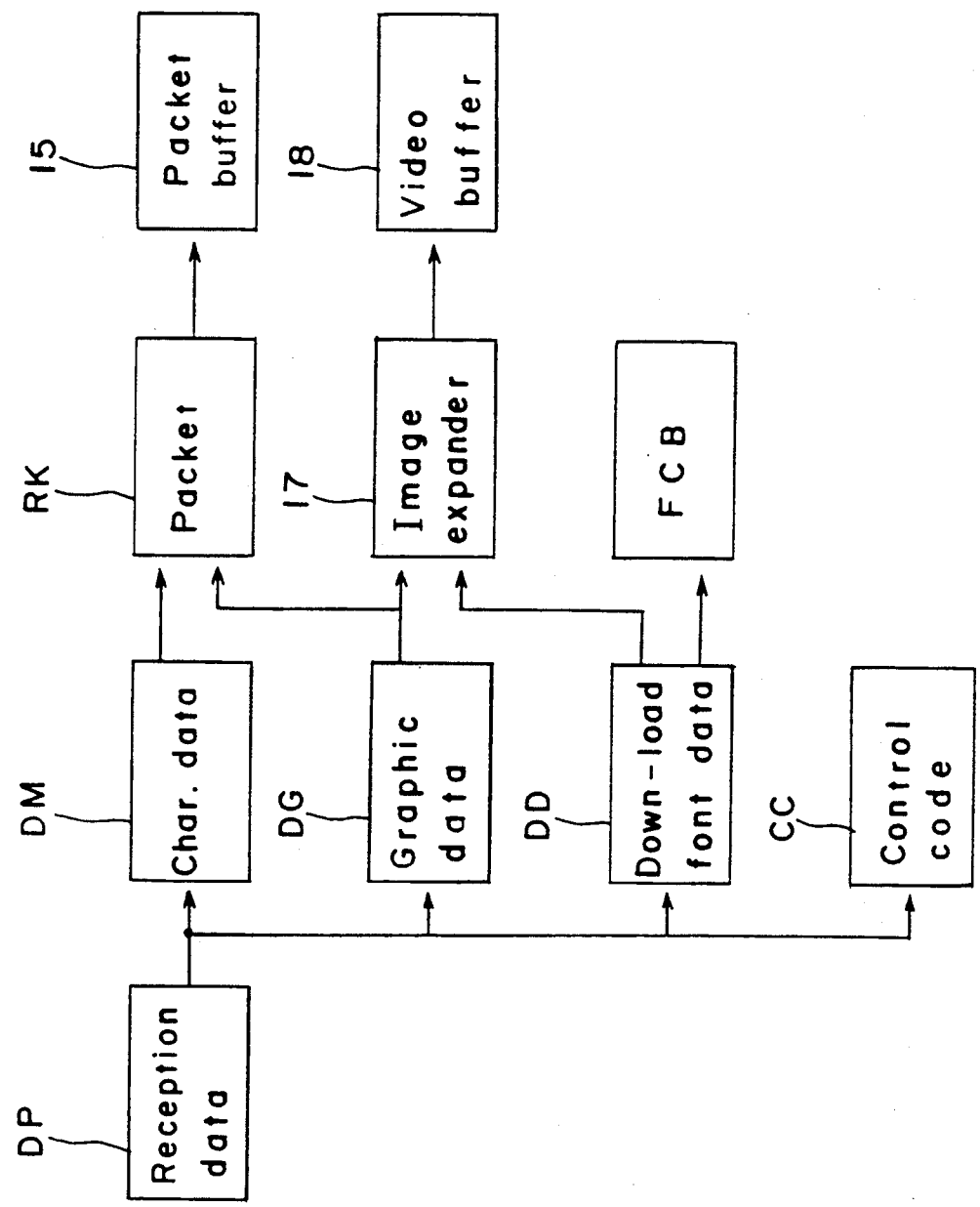
FIG. 10 is a schematic view showing flow of data from a host computer.

Hereinbelow, kinds and processing of the data (reception data DP) transmitted from the host computer 2 are described briefly. FIG. 10 shows schematically flow of the data from the host computer 2. The reception data DP are classified into character data DM, graphic data DG, the down-load font data DD and a control code CC. The graphic data DG include raster data and vector data. The raster data have, for example, a format of [command]+[data length]+[image data of one line]. Meanwhile, the vector data have, for example, a format of [command]+[kinds of line]+[coordinate, size, etc.]. The character data DM and the graphic data, which are print data, are provisionally edited by the edition controller 14. In the character data DM, the packet PK is produced for each character on the basis of an address in the font memory 19, corresponding to a character code and an address for print position so as to be stored in the packet buffer 15.

The graphic data DG ar expanded for each cell in the video buffer 18 by the image expander 17. In the graphic data DG, the packet PK is produced for each cell on the basis of an address in the video buffer 18 and an address for print position. The produced packets PK are stored in the packet buffer 15.

The down-load font data DD are stored in the video buffer 18 by the image expander 17, while font table data are registered in a font control block FCB. The font control block FCB belongs to a system work area 23 of FIG. 1 and stores font control data such as name and physical position of font, etc.

Among the control data DC, commands associated with print control are transmitted to the engine interface controller 21 and other commands are used for setting internal parameters.

Hereinbelow, processing of the print data is described in more detail. In the case of the print data, the packets PK are produced in the edition controller 14. In the character data DM, the packet PK is produced for each character of the character data DM and each character of the character data DM is controlled by the packet PK. Meanwhile, the graphic data DG are divided into cells CL of a predetermined size and the packet PK is produced for each cell and each cell of the graphic data is controlled by the packet PK.

In this embodiment, in the case where the graphic data DG are raster data, the graphic data DG are divided into cells CL extending along respective lines of the lateral direction (main scanning direction) such that the cells CL are controlled by the packets PK, respectively. Meanwhile, in the case where the graphic data DG are vector data, the graphic data DG are divided into cells CL each having an area of 160×160 dots (picture elements) such that the cells CL are controlled by the packets PK, respectively.

Namely, in the case where the graphic data DG are raster data, the cells CL have a size identical with the lateral length of the band buffer 20 and the cell data DC are sequentially arranged in the vertical direction of the band buffer 20. Meanwhile, in the case where the graphic data DG are vector data, the cells CL occupy a square area having a side of a size identical with the vertical width of the band buffer 20 and the cell data DC are sequentially arranged in the lateral direction of the band buffer 20.

Then, the cells CL of the graphic data DG in the case where the graphic data DG are vector data are described in more detail, hereinbelow. FIG. 8 shows a cell map MC. As shown in FIG. 8, imaginary space of one page is divided into square cells CL of 160×160 dots by boundary lines drawn vertically and laterally in a checked pattern. Cell numbers NC are, respectively, allotted to the cells CL. The cell map MC is produced in accordance with size of a document. Namely, when size of the document is changed, the cell map MC is also produced newly. When dot data are sequentially generated by analyzing the vector data, the dot data are controlled as data belonging to the cells having the cell numbers NC corresponding to addresses in one page, i.e. the cell data DC. Such a case may take place in which the dot data of one vector data are controlled based on a plurality of the cells CL.

In order to store the cell data DC, cell areas ECL each having a size identical with that of the cell CL are secured (registered) in the cell data registration are EDC. The cell areas ECL are sequentially registered from below the cell data registration area EDC in the order of the cell data DC which have been required to be stored. When the cell areas ECL have been registered, an initial address ADS of the cell areas ECL is registered in a registration cell address table TCA. The pointer indicates the initial address ADS of the cell area ECL registered latest.

FIG. 9 shows the registration cell address table TCA. The registration cell address table TCA shows relation between the cell numbers NC and the addresses ADS of the cell areas ECL in all the cells CL. The cell area ECL having the address ADS of "0" is not yet registered in the cell data registration area EDC. The cell area of one cell CL is not registered in the cell data registration area EDC doubly or more. Namely, when one initial dot data has been generated, a cell area corresponding to the dot data is registered in the cell data registration area EDC and its address ADS is written in the registration cell address table TCA. When the dot data is subsequently generated in the same cell, it is determined by the registration cell address table TCA that the cell area ECL in which the dot data should be written has already been registered and position (address) of the cell area ECL is obtained such that the cell data DC are expanded in the cell area ECL.

On the other hand, in the case where the graphic data are raster data, the cell map MC and the registration cell address table TCA are not utilized. Namely, the raster data are divided into the cells extending along the lateral lines and the cell data of each cell CL, i.e. the data of one line are sequentially written in a vacant area in the cell data registration area EDC. Therefore, in the case where the graphic data are raster data, writing in the cell area ECL is performed only once and rewriting in the cell area ECL is not performed.

Then, the packets PK are described, hereinbelow. As described above, the packets PK are obtained by provisionally editing the character data D and the graphic data DG. Quantity of data to be controlled by one packet PK is one character in the case of the character data DM. Meanwhile, in the case of the graphic data DG, quantity of data to be controlled by one packet PK is 160×160 dots and one line when the graphic data DG are vector data and raster data, respectively.

Figure 6:
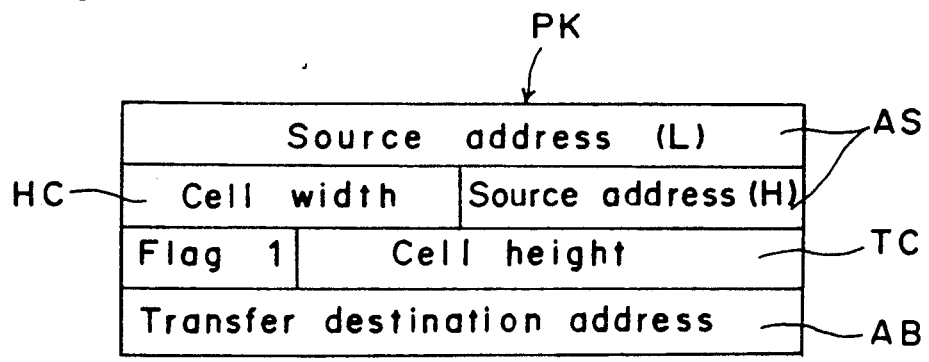
FIG. 6 is a view showing a configuration of one packet.

FIG. 6 shows a configuration of one packet PK. As shown in FIG. 6, one packet PK is constituted by 4 words (16 bits/word) and each of the words contains data such as a source address AS, a cell width HC, a cell height TC, a transfer destination address AB, etc. The source address AS is an initial address of the data to be controlled by the packets PK, such as the font data, the down-load font data DD or the cell data DC. The cell width HC and the cell height TC represent size of the data to be controlled by one packet PK. For example, in the case of the vector data, both the cell width HC and the cell height TC assume 160 dots. The transfer destination address AB is an initial address of a transfer destination in the band buffer 20 and is referred to for transferring the data to the band buffer 20. Meanwhile, when the packets PK are stored in the packet buffer 15, the packets PK are stored in packet areas corresponding to print positions of the data controlled by the packets.

Figure 5:
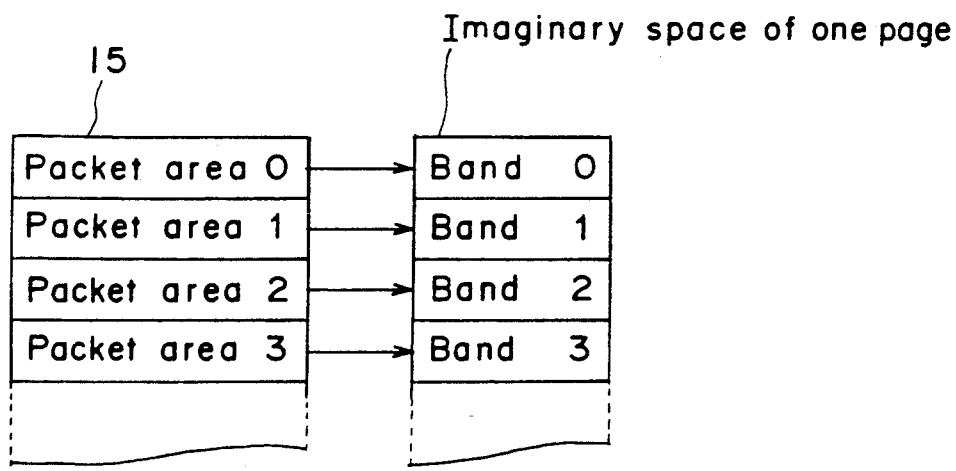
FIG. 5 is a view showing relation between packet areas of a packet buffer and imaginary space of one page.

FIG. 5 shows relation between the packet areas of the packet buffer 15 and imaginary space of one page. As shown in FIG. 5, in accordance with print position (address) of the data controlled by one packet PK in one page, the packet PK is stored in a packet area having a number identical with that of a band containing the address. For example, a packet PK controlling the data to be printed in (transferred to) a band 0 is stored in a packet area 0. In other words, the band to which the data should be transferred is determined by the packet area in which the packet PK controlling the data is stored. Thus, when the data are transferred to the band buffer 20, the data can be sequentially processed at timing closely corresponding to the respective bands.

Hereinbelow, whole processing operations of the laser beam printer 1 are described. The print data transmitted from the host computer 2 are provisionally edited by the edition controller 14. The character data DM are stored, as the packets PK, in the predetermined packet areas of the packet buffer 15. Meanwhile, the graphic data DG are expanded into the image data by the image expander 17 so as to be stored in the video buffer 18 and the packets PK for controlling the expanded image data (cell data DC) are produced so as to be stored in the predetermined packet areas of the packet buffer 15.

Provisional editing of all the print data is performed as described above. When a print control command which is the control code CC for performing printing is issued, the packets PK stored in the packet area 0 of the packet buffer 15 are sequentially read out such that the data are transferred to the band buffer 20a in accordance with contents of the packets PK.

At this time, if contents of the packets PK are directed to the character data DM, the graphic data DG and the down-load font data DD, the predetermined font data of the font memory 19, the cell data DC in the predetermined cell areas ECL in the cell data registration area EDC and the predetermined down-load font data DD in the down-load font data registration area EDD are, respectively, transferred to the transfer destination addresses AB of the band buffer 20a. Namely, the addresses of the transfer destinations of these data are determined by the packet areas storing the packets PK and the transfer destination addresses AB. More concretely, the addresses of the transfer destinations of these data are obtained by adding the transfer destination addresses AB to the initial addresses ADB of the band buffer 20a.

At the time when transfer of the data to the band buffer 20a has been completed or simultaneously with transfer of the data to the band buffer 20a, the print engine 22 is started. Then, the contents of the band buffer 22 are outputted to the print engine 22 and at the same time, the data are transferred to the band buffer 20b on the basis of the contents of the packets PK stored in the packet area 1 of the packet buffer 15. Successively when the contents of the band buffer 20a have been outputted, the contents of the band buffer 20a, which have been just transferred, are outputted. Thus, transfer (writing) of the data to the band buffers 20a and 20b and output (reading) of the data from the band buffers 20a and 20b are performed alternately such that the print data (image data) of one page are printed by the print engine 22.

Figure 2:
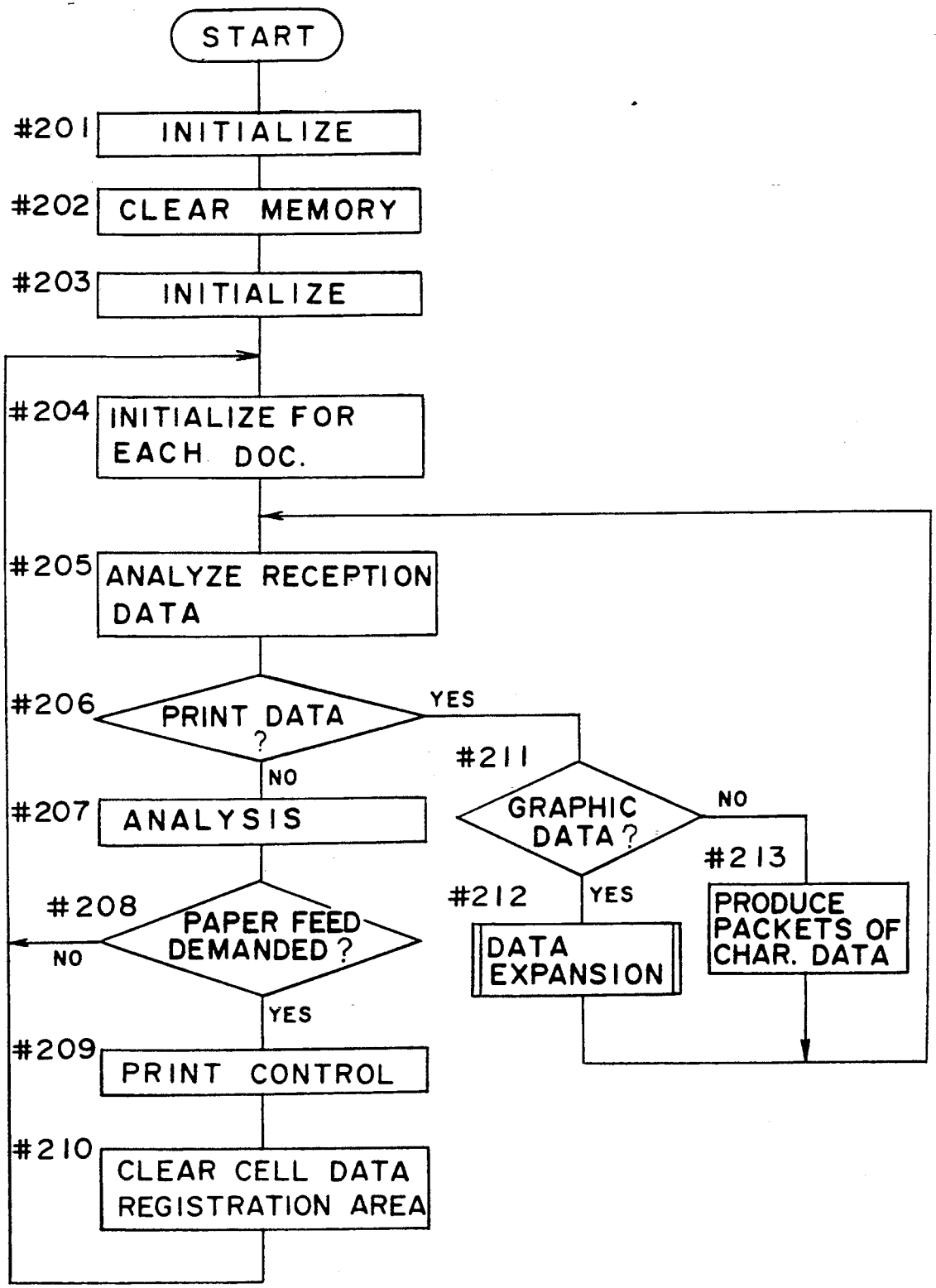
FIGS. 2 to 4 are flow charts showing operations of the laser beam printer of FIG. 1.

Then, operations of the laser beam printer 1 are described with reference to flow charts of FIGS. 2 to 4, hereinbelow. In FIG. 2, when a power switch of the laser beam printer 1 has been turned on, initialization of the CPU and the peripheral circuits is performed at step #201. Then, at step #202, the packet buffer 15, the video buffer 18 and other work areas are cleared. Subsequently, at step #203, initialization is performed by a dip switch and default setting. Then, at step #204, initialization is performed for each document by formulating the cell map MC or initializing the packet buffer 15. This initialization is performed only when designated sizes of the document such as A4, B5, etc. have been changed. Thereafter, at step #205, the reception data received by data reception processing (FIG. 4) to be described later are analyzed. Then, it is decided at step #206 whether or not the reception data are print data. Since the first portion of the reception data is the control data (control code CC) and is not print data, a decision of "NO" is made at step #206 and thus, at step #207, contents of the reception data are analyzed and processing corresponding to the contents of the reception data are performed.

If it is found at step #208 that paper feed is demanded, the program flow proceeds to step #209 in which print control is performed. However, since paper feed is not demanded initially, a decision of "NO" is made at step #208, the program flow returns to step #204. In the case where size of the document has been changed as a result of analysis at step #207, initialization corresponding to the size of the document is performed at step #204. If it is found at step #206 that the reception data are print data, a decision is made at step #211 as to whether or not the print data are the graphic data DG. In the case of "YES" at step #211, expansion of the data is performed at step #212. On the contrary, in the case of "NO" at step #211, namely, if the print data are the character data DM, the packets of the character data DM are produced on the basis of the character data DM at step #213. Expansion of the data is described later with reference to FIG. 3.

When the print data have been finished and the control code CC for paper feed has been issued, namely, in the case of "YES" at step #208, print control is performed at step #209. In this print control, the print engine 22 is started, a command for feeding documents from a paper cassette is transmitted, the data are transferred to the band buffers 20a and 20b alternately and the data are alternately read from the band buffers 20a and 20b so as to be outputted to the print engine 22. When print control has been completed, the cell data registration area EDC in the video buffer 18 is cleared at step #210. This clearance is applied to the address ADS indicated by the pointer in the cell data registration area EDC and the addresses following said address ADS.

Figure 3:
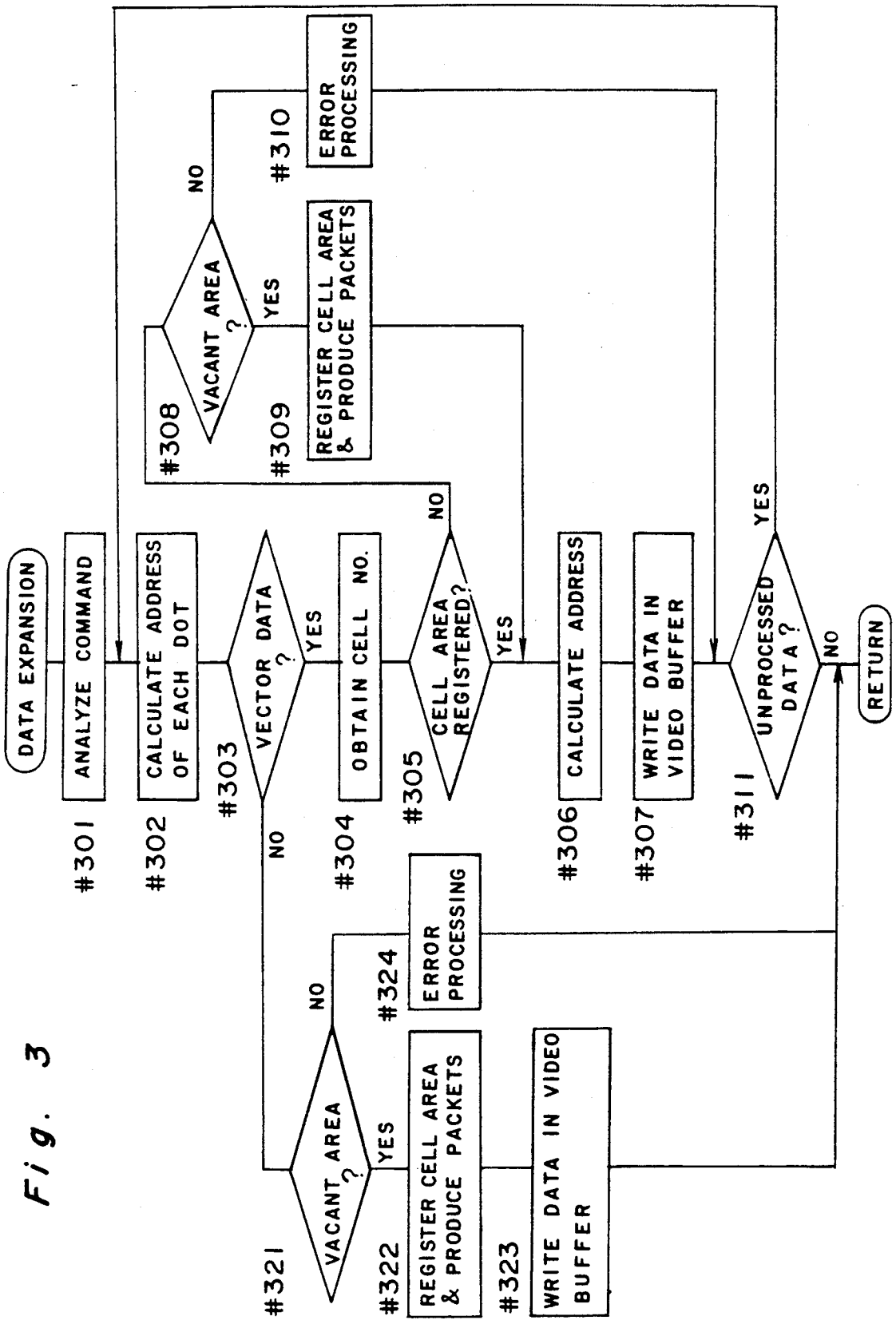

FIG. 3 is a flow chart showing data expansion of the above described step #212. Initially, at step #301, the command is analyzed and the dot data (image data) are generated if the graphic data are vector data. Then, at step #302, address (absolute coordinate) of each dot in imaginary space of one page is calculated. Subsequently, it is decided at step #303 whether or not the graphic data are vector data. In the case of "YES" at step #303, the cell number NC of the cell corresponding to the calculated coordinate is obtained from the cell map MC at step #304 and it is found at step #305 that the cell area ECL of the cell number NC has already been registered. In the case of "YES" at step #305, the address for writing the cell area ECL is obtained from the absolute coordinate of the dot data at step #306 and the data are written in the cell area ECL of the video buffer 18 at step #307.

In the case of "NO" at step #305, namely, if the cell area ECL has not yet been registered, it is decided at o step #308 whether or not there is a vacant area in the cell data registration area EDC of the video buffer 18. In the case of "NO" at step #308, error processing is performed at step #310 by displaying overflow of the cell data registration area EDC. When a command for starting printing is inputted subsequently, only the print data which have been edited are printed.

In the case of "YES" at step #308, the cell area ECL is newly registered (secured) in the cell data registration area EDC so as to be written in the registration cell address table TCA and the packets PK are produced at step #309 followed by step #306.

These processings are performed for all the dot data until a decision of "YES" is made at step #311 for judging whether or not unprocessed data exist. Thus, the graphic data DG are expanded into the image data (cell data DC) and written in the predetermined cell areas ECL. In the case of "NO" at step #303, namely, if the graphic data are raster data, it is decided at step #321 whether or not there is a vacant area in the cell data registration area EDC of the video buffer 18. In the case of "NO" at step #321, error processing is performed at step #324 in the same manner as described earlier. In the case of "YES" at step #321, the cell area ECL is registered in the cell data registration area EDC and the packets PK are produced at step #322. Then, at step #323, data of one line are written in the registered cell area ECL of the video buffer 18.

Figure 4:
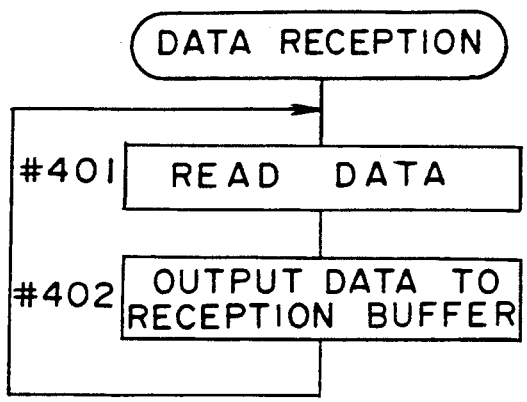

FIG. 4 is a flow chart showing data reception processing. The data from the host computer 2 are received unsynchronously with the above described other processings at step #401 and are outputted to the reception buffer 12 at step #402.

In the above described embodiment, since the two small band buffers 20a and 20b are employed in place of a bit map memory of one page, capacity of the memory can be reduced. The graphic data DG transmitted from the host computer 2 are temporarily expanded into the image data in band buffers 20a and 20b from the video buffer 18 at the time of printing. Therefore, writing in the band buffers 20a and 20b can be performed at high speed without lowering printing speed of the laser beam printer 1.

Meanwhile, since the image data expanded from the graphic data DG are divided into the small cells CL and the cell data DC are expanded for each cell CL, it is only necessary to provide a minimum memory area necessary for expanding the image data, so that the video buffer 18 does not require a large capacity.

Furthermore, since shape and size of the cell CL are made different from each other in the graphic data DG between raster data and vector data such that raster data and vector data are processed in accordance with respective data characteristics, the cell data CL can be stored efficiently and capacity of the video buffer 18 can be reduced. Especially, regarding raster data, since necessity for rewriting raster data is extremely small, control for the registration cell address table TCA and rewriting is omitted. Thus, the memory area is reduced accordingly and processing speed is raised.

Therefore, in the present invention, partial graphic forms or illustrations can be handled in the same manner as in an arrangement provided with a full-page bit map memory in spite of its small memory capacity. Furthermore, by increasing memory capacity of the video buffer 18, it becomes possible to easily handle also graphic forms occupying one whole page.

In the above described embodiment, 160×160 dots and one line are provided as one cell CL in the case of vector data and raster data, respectively. However, it is also possible to change size of the cell CL in accordance with printing density. For example, if printing density is 300 dpi, one cell Cl may be formed by 160×160 dots also in the case of raster data. Furthermore, it may be possible to change shape and size of the cell CL variously.

In the above described embodiment, arrangements of sections of the laser beam printer 1, structure and size of the bands, the cells CL, the cell map MC, the registration cell address table TCA, the video buffer 18, etc. or the flow charts can be changed variously from those described above.

As is clear from the foregoing, in accordance with the present invention, writing in the band buffer can be performed at high speed without the need for increasing the memory are and it becomes possible to handle the graphic data.

Moreover, in accordance with the present invention, since the data can be stored efficiently, the memory area is reduced further and processing speed is raised greatly.

Although the present invention has been fully described by way of example with reference to the accompanying drawing, it is to be noted here that various changes and modifications will be apparent to those skilled in the art. Therefore, unless otherwise such changes and modifications depart from the scope of the present invention, they should be construed as being included therein.

What is claimed is:

1. An image data processor for use in an image forming apparatus in which image data of one page are received from outside and bit data based on the image data are supplied to a printing portion in a predetermined quantity each time such that a whole of an image of the one page is printed, said image data processor comprising:

an analysis means for sequentially analyzing the image data received from the outside;

a data formulating means for sequentially formulating the bit data in accordance with analytic results of the image data by said analysis means, first and second memories for storing the bit data formulated by said data formulating means, said first memory having a memory capacity enabling storage of the predetermined quantity of the bit data;

an output means for outputting to the first memory, the bit data stored in said second memory; and a supply means for supplying to said printing portion, the predetermined quantity of the bit data stored in said first memory.

2. An image data processor as claimed in claim 1, wherein said first memory includes at least two storage portions such that writing and reading of the bit data are performed alternately between said storage portions.

3. An image data processor for use in an image forming apparatus in which image data of one page are received from outside and bit data based on the image data are supplied to a printing portion in a predetermined quantity each time such that a whole of an image of the one page is printed, said image data processor comprising:

an analysis means for sequentially analyzing the image data received from the outside;

a first memory which is capable of storing the predetermined quantity of the bit data;

a second memory which stores, when it was found from analytic results of the image data by said analysis means that the bit data exist in a large quantity exceeding the predetermined quantity, the large quantity of the bit data;

a first control means for storing the predetermined quantity of the bit data in said first memory sequentially from a print starting side of the one page in accordance with the analytic results of the image data by said analysis means;

a second control means which causes, in the case where the large quantity of the bit data stored in said second memory are of a quantity falling within a range of storage of said first memory, said first memory to store the large quantity of the bit data; and a supply means for supplying to said printing portion, the bit data stored in said first memory.

4. An image data processor which receives image data of one page from outside so as to supply to a printing portion, bit data based on the image data, comprising:

an analysis means for sequentially analyzing the image data received from the outside;

a data formulating means for sequentially formulating the bit data on the basis of analytic results of the image data by said analysis means;

a memory for storing the bit data contained in one cell, said cell being one of a plurality of cells into which the one page is divided imaginarily;

a control means which secures in said memory, a cell memory area corresponding to said cell provided at a location where the bit data formulated by said data formulating means should be written, said control means causing said cell memory area to store the bit data;

a registration means for registering an address of said cell memory area in said memory; and a writing means which enables new bit data to be written in said cell memory area of said cell by referring to the address registered by said registration means.

5. An image data processor which receives image data of one page from outside so as to supply to a printing portion, bit data based on the image data, comprising:

an analysis means for sequentially analyzing the image data received from the outside;

a data formulating means for sequentially formulating the bit data on the basis of analytic results of the image data by said analysis means;

a memory for storing the bit data contained in one cell, said cell being one of a plurality of cells into which the one page is divided imaginarily;

a control means which secures in said memory, a cell memory area corresponding to said cell provided at a location where the bit data formulated by said data formulating means should be written, said control means causing said cell memory area to store the bit data;

a registration means for registering an address of said cell memory area in said memory;

a decision means for deciding whether or not a cell memory area for storing the bit data contained in said cell as well as the bit data formulated newly by said data formulating means has already been secured;

a writing means which writes, in the case where it was found from a decision of said decision means that said cell memory area has already been secured, in said cell memory area the bit data formulated newly by said data formulating means, by referring to the address registered by said registration means; and an actuation means which actuates said control means and said registration means in the case where it was found from the decision of said decision means that said cell memory area has not yet been secured.

6. An image data processor which receives image data of one page from outside so as to supply to a printing portion, bit data based on the image data, comprising:

an analysis means for sequentially analyzing the image data received from the outside;

a data formulating means for sequentially formulating the bit data on the basis of analytic results of the image data by said analysis means;

a first memory for storing the bit data contained in one cell, said cell being one of a plurality of cells into which the one page is divided imaginarily;

a first control means which secures in said first memory, a cell memory area corresponding to said cell provided at a location where the bit data formulated by said data formulating means should be written, said first control means causing said cell memory area to store the bit data;

a registration means for registering an address of said cell memory area in said first memory;

a writing means which enables new bit data to be written in said cell memory area of said cell by referring to the address registered by said registration means;

a second memory for storing the bit data to be supplied to said printing portion;

second control means for causing said second memory to store the bit data formulated by said data formulating means and the bit data stored in said cell memory area in said first memory; and an output means for outputting the bit data from said second control means to said printing portion.

7. An image data processor in which image data of one page are received from outside and bit data based on the image data are supplied to a printing portion in a predetermined quantity each time such that a whole of an image of the one page is printed, comprising:

first and second memories each of which is capable of storing the bit data of predetermined lines of the one page;

a control means for controlling operations of said first and second memories so as to effect writing and reading of said first and second memories alternately such that the bit data are read from one of said first and second memories when the bit data are being written in the other one of said first and second memories;

an analysis means for sequentially analyzing the image data received from the outside;

a third memory which stores the bit data when it was found from analytic results of the image data by said analysis means that the bit data exist in a quantity exceeding the predetermined lines;

a control means which alternately causes, in accordance with the analytic results of the image data b said analysis means, said first and second memories to sequentially store the bit data of the predetermined lines each time from a print starting side of the one page;

an output means which outputs, in the case where the bit data stored in said third memory are in the image region wherein the bit data stored in said first memory or said second memory by said control means, the bit data to said first memory or said second memory; and a supply means for alternately supplying the bit data stored in said first memory and said second memory, to said printing portion.

8. An image data processor in which image data of one page are received from outside and a bit image based on the image data is supplied from a print starting line to a printing portion in a quantity of predetermined lines each time such that a whole of an image of the one page is printed, comprising:

first and second memories each of which is capable of storing bit data of the predetermined lines;

an analysis means for sequentially analyzing the image data received from the outside;

an expansion means which expands, if it was found from analytic results of the image data by said analysis image data are graphic data, the image data into the bit data;

a third memory for storing the bit data contained in one cell, said cell being one of a plurality of cells into which the one page is divided imaginarily;

a first control means which secures in said third memory, a cell memory are corresponding to said cell provided at a location where the bit data expanded by said expanded by said expansion means should be written, said first control means causing said cell memory area to store the bit data;

a second control means which expands, on the basis of the analytic results of the bit data by said analysis means, the bit data contained in the predetermined lines and causes said first memory or said second memory to store the bit data contained in the predetermined lines;

a registration means for registering an address of said cell memory area in said third memory;

a writing means which enables new bit data to be written in said cell memory area of said cell by referring to the address registered in said registration means;

a third control means which causes, in the case where said cell contained in the predetermined lines under processing is stored in said third memory, said first memory or said second memory to store the bit data stored in said third memory; and a supply means for alternately supplying to said printing portion, the bit data stored in said first memory and said second memory.

* * * * *